UNITED STATES PATENT OFFICE.

GARDNER HEWETT, OF NEW YORK, N. Y.

EXCITANT FOR VOLTAIC CELLS.

SPECIFICATION forming part of Letters Patent No. 512,962, dated January 16, 1894.

Application filed April 3, 1893. Serial No. 468,932. (Specimens.)

*To all whom it may concern:*

Be it known that I, GARDNER HEWETT, of the city, county, and State of New York, have invented a new and useful Improvement in Excitants for Voltaic Cells, of which the following is a specification.

The object of my invention is to provide an excitant for voltaic cells in the form of a dry powder which will retain its condition indefinitely, which will not deliquesce or in any other respects alter its condition under atmospheric or other ordinary influences, and which is easily soluble in water to produce a powerful electrolyte for use in such cells. The advantage of an exciter in this condition is that it may be supplied to the markets in easily portable form and may be dissolved by the user when the battery is set up, thus saving the necessity of handling acid or corrosive liquids, while at the same time affording an excitant which is uniform in composition, of low resistance and powerful in chemical attack.

My exciter consists of sulphuric acid, sulphate of soda and bisulphate of mercury put together in the following way: To one part of sulphuric acid I add two parts of sulphate of soda; to ten parts of this compound I add one-tenth part of bisulphate of mercury. The acid is first heated to a sufficient extent to dissolve the sulphate of soda and the bisulphate of mercury which serves to amalgamate the zinc and prevent local action is subsequently added. This produces a fluid compound when hot, but as it cools, sets into a hard, crystalline mass, which may be ground to powder in any suitable way. This powder is not affected by atmospheric or other ordinary influences, it gives off no acid fumes, it requires no special care in packing or handling, and when combined with water in the proportion of about one pound of powder to a gallon of water, forms a strong and efficient exciting liquid of comparatively low resistance. I propose to supply this powder to the market as a new article of manufacture and sale for the purposes hereinbefore set forth.

I claim—

1. An excitant for voltaic cells consisting of sulphuric acid and sulphate of soda prepared in a dry state, substantially as described.

2. An excitant for voltaic cells consisting of sulphuric acid, sulphate of soda and bisulphate of mercury prepared in a dry state, substantially as described.

3. As a new article of manufacture, an excitant for voltaic cells consisting of sulphuric acid, sulphate of soda and bisulphate of mercury prepared in the form of a dry powder.

GARDNER HEWETT.

Witnesses:
H. R. MOLLER,
M. BOSCH.